US008001699B2

(12) United States Patent
Randall

(10) Patent No.: US 8,001,699 B2
(45) Date of Patent: Aug. 23, 2011

(54) ELECTRONIC KEY IMPRESSIONING (EKI) DEVICE, METHOD AND PROGRAM PRODUCT

(76) Inventor: Stephen Randall, Manahawkin, NJ (US)

( * ) Notice: Subject to any disclaimer, the term of this patent is extended or adjusted under 35 U.S.C. 154(b) by 0 days.

(21) Appl. No.: 12/565,387

(22) Filed: Sep. 23, 2009

(65) Prior Publication Data

US 2011/0067254 A1 Mar. 24, 2011

(51) Int. Cl.
*G01B 7/34* (2006.01)
*E05B 19/20* (2006.01)

(52) U.S. Cl. ........................................... 33/540; 70/394

(58) Field of Classification Search .................... 33/540, 33/539; 70/394
See application file for complete search history.

(56) References Cited

U.S. PATENT DOCUMENTS

| | | | | |
|---|---|---|---|---|
| 1,991,151 | A * | 2/1935 | Hansen | 33/540 |
| 2,257,054 | A * | 9/1941 | Hoffman | 33/540 |
| 4,229,959 | A | 10/1980 | Easley | |
| 4,300,416 | A * | 11/1981 | Ross | 81/463 |
| 4,535,546 | A | 8/1985 | Smith | |
| 4,680,870 | A | 7/1987 | McConnell | |
| 5,172,578 | A | 12/1992 | Bitzios | |
| 5,325,691 | A | 7/1994 | Embry | |
| 6,134,928 | A | 10/2000 | Kang | |
| 6,382,007 | B1 | 5/2002 | Wright | |
| 6,722,172 | B2 | 4/2004 | Pinkhasov et al. | |
| 7,243,437 | B1 | 7/2007 | Estrada | |
| 7,614,158 | B2 * | 11/2009 | Uttaro | 33/540 |
| 2010/0236085 | A1 * | 9/2010 | Capehart | 33/540 |

* cited by examiner

*Primary Examiner* — Christopher W Fulton
(74) *Attorney, Agent, or Firm* — Murphy & King, P.C.

(57) ABSTRACT

An electronic device for impressioning a lock comprises a housing having a key decoder secured to the housing and a connector for connection to electronic circuitry. A key decoder portion extends from the housing for insertion into a keyway. A groove extends along a surface of the key decoder. An insulated conductor is positioned in the groove. An exposed portion serves as a reader of wafers positions in the keyway as the key decoder slides through the keyway. An electrical measuring device is secured to the housing and includes a slidable member including the reader, both of which are connected through a sensor interface included in the housing. When the reader engages and disengages with a wafer, the measuring device transmits electrical signals to the electronic circuitry which mathematically calculates a cut in a key blank for each wafer using stored programs for fitting a key to the lock.

22 Claims, 4 Drawing Sheets

ELECTRONIC KEY IMPRESSIONING (EKI) DEVICE, METHOD AND PROGRAM PRODUCT

FIELD

This invention relates to lock impressioning devices, methods and program products. More particularly, the invention relates to electronic lock impressioning devices, methods and program products mathematically calculating cuts in a key decoder in fitting a key to a lock.

BACKGROUND

Locksmiths use a procedure known as impressioning to determine what is known as the bitting or key code of an automobile lock. Impressioning is usually preformed on the door lock of a vehicle and is essentially a trial and error procedure using marks made on a key blank by the wafers inside of the lock. Using a file a locksmith will remove material wherever a visible mark appears on the key until the key can open the lock. This process is often used when the original key has been completely lost and no key is available for duplication. Once completed the locksmith can determine the code of the cuts made on the impressioned key. With this code the locksmith can use a key cutting machine that is capable of cutting a key by code to create a new key or he can simply duplicate the key that has been impressioned. However, this process is labor intensive and time consuming and most automobile door locks do not contain all the codes necessary to turn the ignition or trunk. In many cases one or two additional cuts are required to turn the ignition. To complete the key a locksmith will either continue to file down the cut, repeatedly testing the key in the ignition or trunk until the lock opens. Or he will use a software package that will provide the remaining possible code combinations using the code that has been determined from the door lock.

To advance the practice of lock impressioning, what is needed is an Electronic Key Impressioner or (EKI) to reduce the amount of labor and time required to replace a lost or missing key by mathematically calculating cuts for a replacing key using stored programs executed by electronic circuitry based on measurements by an impressioner.

SUMMARY

An electronic device for impressioning a lock comprising a sequence of vertical channels along a keyway, each channel including a spring loaded, slidable wafer in the channel. The device comprises a housing having a key decoder blank, hereinafter key decoder, secured to the housing and a connector for connection to electronic circuitry. A key decoder portion extends from the housing for insertion into the keyway. The key decoder contains divergent sloping surfaces at the mid-point of the end thereof. A groove extends along an upper surface of the key decoder. An insulated conductor is positioned in the groove. An exposed portion of the conductor extends beyond the end of the key decoder and serves as a reader of wafers positions in the keyway as the key decoder slides through the keyway.

An electrical measuring device is secured to the housing and includes a slidable member including the reader, both of which are connected through a sensor interface included in the housing. The slider moves in synchronism with the reader as it is urged through the keyway. The resistance of the measuring device varies linearly with the position of the slider. When the reader engages a wafer, a circuit is completed through the measuring device. The slider position provides a position value C1 for the reader coming into contact with the wafer. Once the reader passes the wafer and is no longer in contact, the circuit is open and the slider provides a position value C2. The position values C1 and C2 are stored for each wafer. The distance the reader has moved while in contact with the wafer is L1=C2−C1. The horizontal distance from the tip of the reader to the point of contact with the slidable wafer engaging the key decoder is X=L2−L1. The base of the sloping surface is stored as a constant L2. The height of the sloping surface is stored as a constant L3. The cut (C) in the key for the slidable wafer contacting the key decoder is C=L3−Y where Y is the tangent of the sloping surface of the key decoder. After C has been acquired, the process is repeated for each slidable wafer in the keyway in forming an impression in fitting a key to a lock.

DRAWINGS

DESCRIPTION OF A PREFERRED EMBODIMENT

Figure 1:
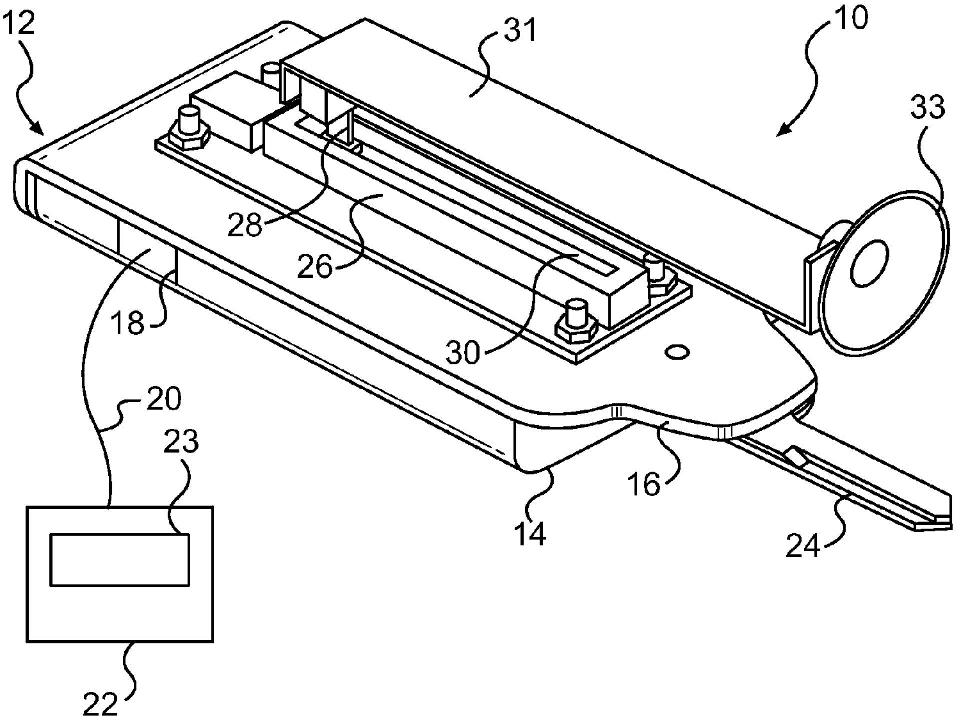
FIG. 1 is an exemplary representation of an assembly view of an EKI incorporating the principles of the present invention.
Figure 1A:
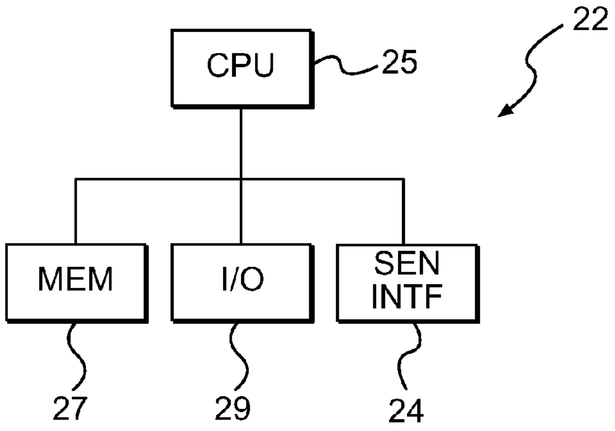
FIG. 1A is a representation of a computer system coupled to the EKI of FIG. 1.

Referring to FIG. 1, an embodiment of an Electronic Key Impressioner 10 is comprised of a housing 12 including a chamber 14 and a cover 16 fastened to the housing. Included within the housing is a connector 18, typically a universal serial bus (USB) 18 for connection via a signal cable 20 to a computer system 22 including a Graphical User Interface 23 for entering and displaying data of the system. The system 22, shown in FIG. 1A, further comprises a standard processor 25, a memory 27, and input/output circuitry 29. The processor is connected to a Sensor interface 4 (See FIG. 2), typically a commercially available interface from Phidgets Interface, Calgary, Canada, T2M, 3K7. The interface 4 enables the processor 25 to calculate resistance measurements, via a computer program stored in the memory 27, as will be described hereinafter. Attached to the cover is a key decoder 24 for insertion into a keyway of a lock (See FIG. 3) and impressioning wafer tumblers within the lock.

Secured to the cover is an electrical measuring device 26, typically a potentiometer or the Sensor Interface 4 linked to the computer 22 for calculating resistance measurement corresponding to the displacement of the wafer tumblers of the lock along and from the beginning of the keyway. A slider 28 is urged along a slot 30 in the device by an operator (not shown) to initiate electrical measurement, corresponding to wafer tumbler positions in the keyway, as will be described hereinafter. Attached to the housing is a mounting bracket 31, including a suction cup 33 which, when depressed against an outer surface of the lock, steadies the key decoder in the keyway for taking electrical measurements.

Figure 2:
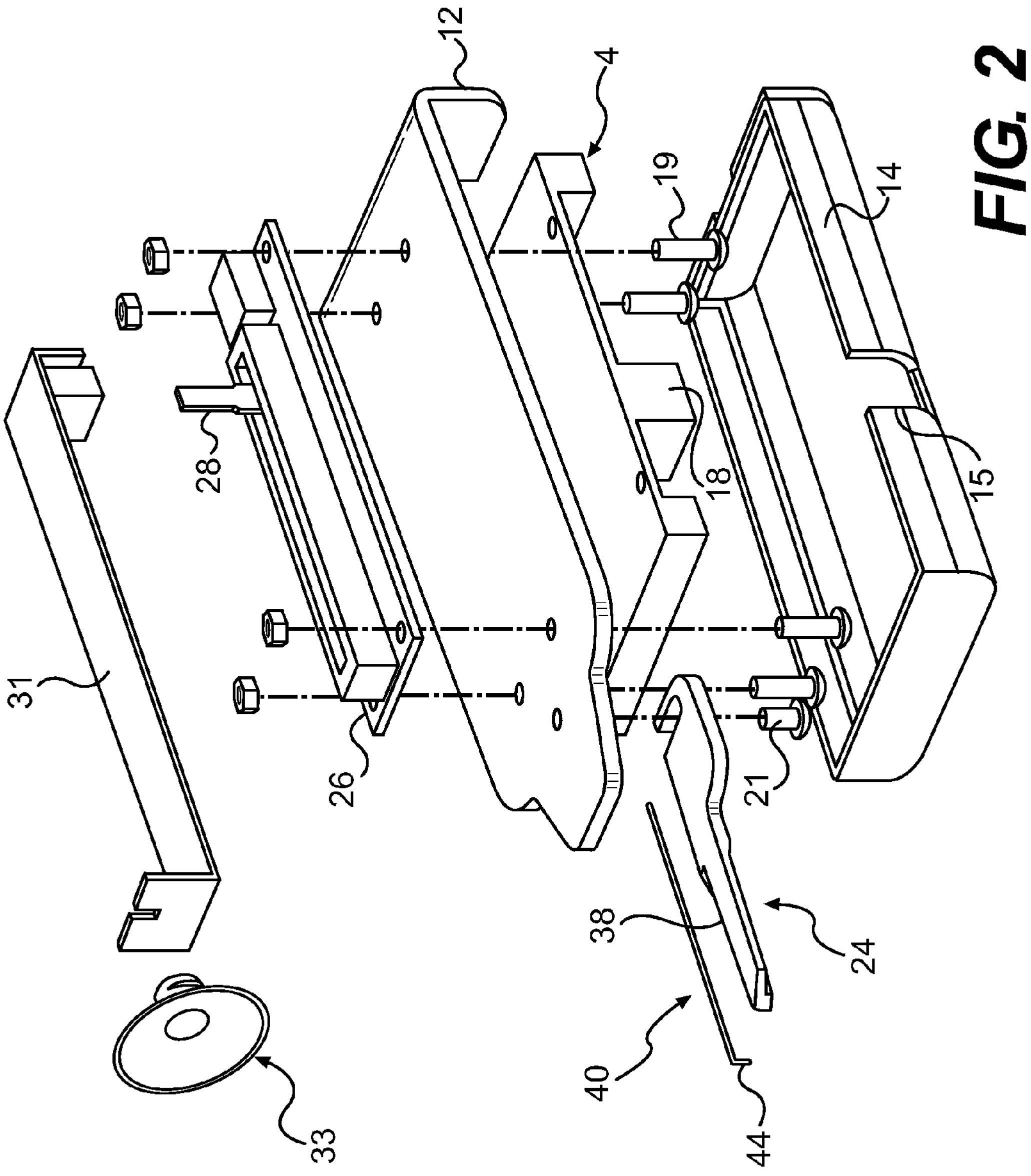
FIG. 2 is an exploded view of the exemplary EKI shown in FIG. 1.

FIG. 2 shows an exploded view of the impressioner 10 of FIG. 1. The chamber 14 includes an opening 15 enabling the connection of the sensor interface to the signal cable 20 (see FIG. 1). The chamber further includes fasteners 19 which extend through openings in the cover plate 16 and attach the chamber 14, cover plate 16 and connector 18 together to form the housing 12.

The key decoder 24 is secured to the cover plate by appropriate fasteners 21 included in the chamber. A slot 38 is installed along the length of the key decoder shank. A conductor 40 is disposed in the slot. The conductor is insulated except for a portion 44, which is exposed at one end thereof and serves as the Reader to determine (i) when wafers or tumblers in the keyway are contacted and (ii) when contact with the wafers or tumblers is ended.

The conductor at the other end (not shown) is connected to the slider 28 of the measuring device 26. The slider, when moved by an operator, urges the Reader 44 along the keyway ahead of the key decoder. When the Reader contacts a wafer tumbler, an electrical circuit is completed from the wafer, which is grounded, through the Sensor interface 4. The circuit enables the Sensor interface to calculate resistance measurement at the slider position, corresponding to the distance the Reader has traveled in the keyway to contact a wafer tumbler, as will be described in connection with the description of FIG. 4. As previously indicated, the mounting bracket 31 and suction cup 33 hold the impressioner 10 steady while making the electrical measurements.

Figure 3:
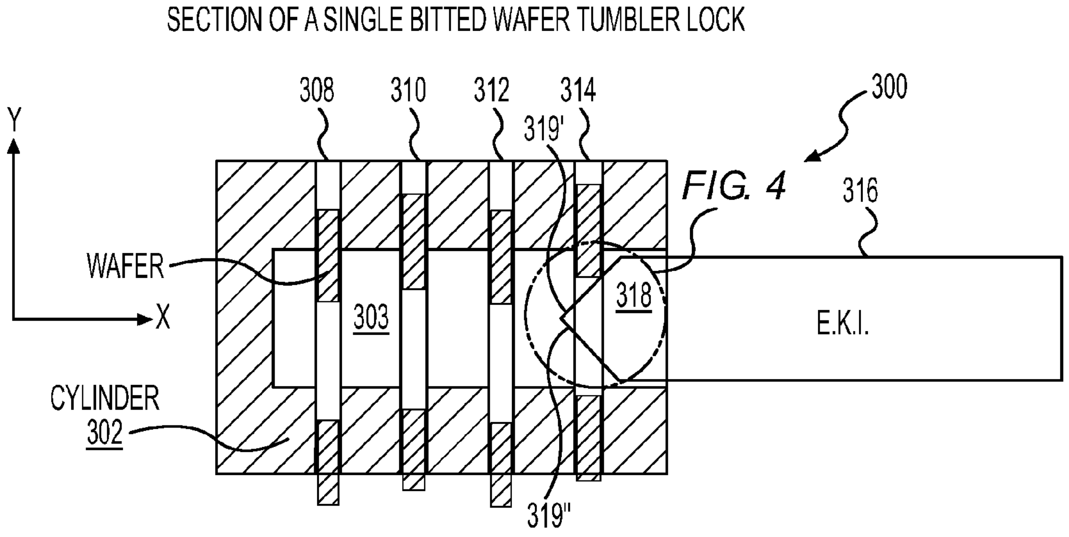
FIG. 3 is a representation of a portion of the EKI of FIG. 1 inserted into a single bitted wafer tumbler lock for purposes of electronically determining the key code recognized by the lock.

FIG. 3 discloses a section of a single bitted wafer tumbler lock 300. The lock includes a cylinder 302 and a keyway channel 303 disposed within the cylinder 302. A plurality of spring-loaded (not shown) wafer tumblers 308, 310, 312, 314 is located in channels perpendicular to the keyway. The number of wafer tumblers, typically 5-8 is selected according to the desired strength of the lock. The wafer tumblers extend into the keyway to engage cuts or codes in a key. When all of the cuts in a key are engaged by the wafer tumblers, the lock can be opened or set.

A key decoder 316 for impressioning the wafer tumblers in the lock 300 is inserted into the keyway 303. The key decoder includes a nose portion 318 including divergent sloping surfaces 319' and 319". As the key decoder is urged along the keyway, the wafer tumblers contact the sloping surfaces at points along the surfaces, according to the spring load pressure applied to each wafer tumbler. The point of contact defines the position of a cut to be made in the key. The dimensions of the cuts are mathematically determined for each wafer in impressioning a lock, as will be described in connection with FIG. 4.

Figure 4:
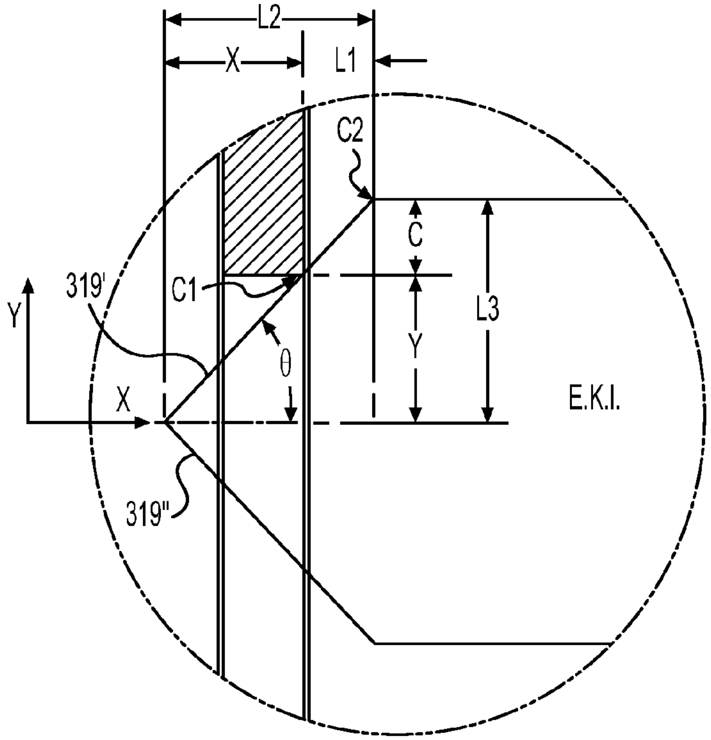
FIG. 4 is a representation of measurements made by the EKI in advancing through the lock for purposes of determining the key code for the lock.

In FIG. 4, the dimensions of each cut in the key blank are determined using the law of tangents for a right triangle. The law requires that the base L2, height L3 and angle θ of the triangle be known in calculating a cut for a wafer tumbler. After the Reader comes into contact with the first wafer tumbler, the computer system 22 (FIG. 1) executes a series of routines, as will be described hereinafter, to determine the depth of cut in the key blank for each wafer tumbler. The parameters involved in determining the cuts are as follows:

C1=Position of the Reader 44 upon first contact with the wafer 314.

C2=Position of the Reader when it is no longer in contact with the wafer 314.

L1=The distance the Reader has moved while in contact with the wafer 314.

L2=The measured triangle base.

L3=The measured triangle height.

X=Horizontal distance from the tip of the Reader to the point of contact

Y=Vertical distance of the point of contact C1.

θ=Angle between the X-axis of the key and the Reader.

C=Actual Cut depth.

Count=Number of wafers read on one side of the lock.

ShutterLoc=The position of the Reader when in contact with the shutter door (not shown).

ShutterRng=The region around the shutter doors that is ignored.

The operation of the EKI 10 will be described in a process 500, taken in conjunction with FIGS. 1-4, for calculating cut dimensions in the key decoder for the wafer tumblers in the lock 300, as follows:

An operation 502 connects the signal cable 20 from the impressioner 10 to the processor 22.

An operation 504 enters into the processor 22 the number of wafers that are to be measured or the number is left blank if unknown.

An operation 506 degreases the lock 300 and lubricates the Reader tip 44.

An operation 508 inserts the key decoder into the lock after grounding and attaching the suction cup to the lock surface near the shutter doors (not shown).

An operation 510 removes and re-inserts the key decoder into the lock to snap the wafer tumblers into their proper position; otherwise they could tend to stick in a wrong position.

An operation 512 engages the Reader with the first wafer tumbler in the lock. An electrical circuit is completed from the wafer through the Reader to the sensor interface 4. A resistance measurement is performed for the circuit by sensor interface. The resistance measurement is translated by the computer 22 into a distance corresponding to the distance the wafer is located along the keyway from entrance thereof.

An operation 514 detects when the Reader moves past the wafer and the circuit open-circuited.

An operation 516 initiates a sub-routine stored in the computer system the parameters defined above for mathematically determining the dimensions of the cut for the first wafer, as follows:

$$L1=C2-C1$$

$$X=L2-L1$$

$$Y=(\text{Tangent}(\theta)*X)$$

$$C=L3-Y$$

Once the first cut has been determined, the Count is incremented by 1, after a time delay of a few milliseconds is added to account for wafer bounce before the count variable is allowed to be incremented. Thereafter, the operations 512-516 are repeated for each wafer tumbler in the lock 300, the combination of cuts for the wafers forming a code.

The wafer code in one form is printed out by the computer 22 and hand delivered to a locksmith for application to a standard key cutting machine or is electronically delivered to a key cutting machine, e.g. PC+, Curtis Industries, Cleveland for fabrication of a replacement key for a user.

To eliminate a false code in the first wafer position due to the shutter door, a subroutine "CODE TO DETERMINE LOCATION OF SHUTTER DOOR AND STORE RANGE:" below requires that the user attach the EKI 10 to the shutter door of the lock. The user then indicates via the GUI 23 that the Reader is in contact with the shutter door. The program then stores the location of the shutter door in the variable ShutterLoc. Using the location value, a range around the shutter door is generated for the variable ShutterRng. Any codes calculated in this region are ignored.

Figure 5:
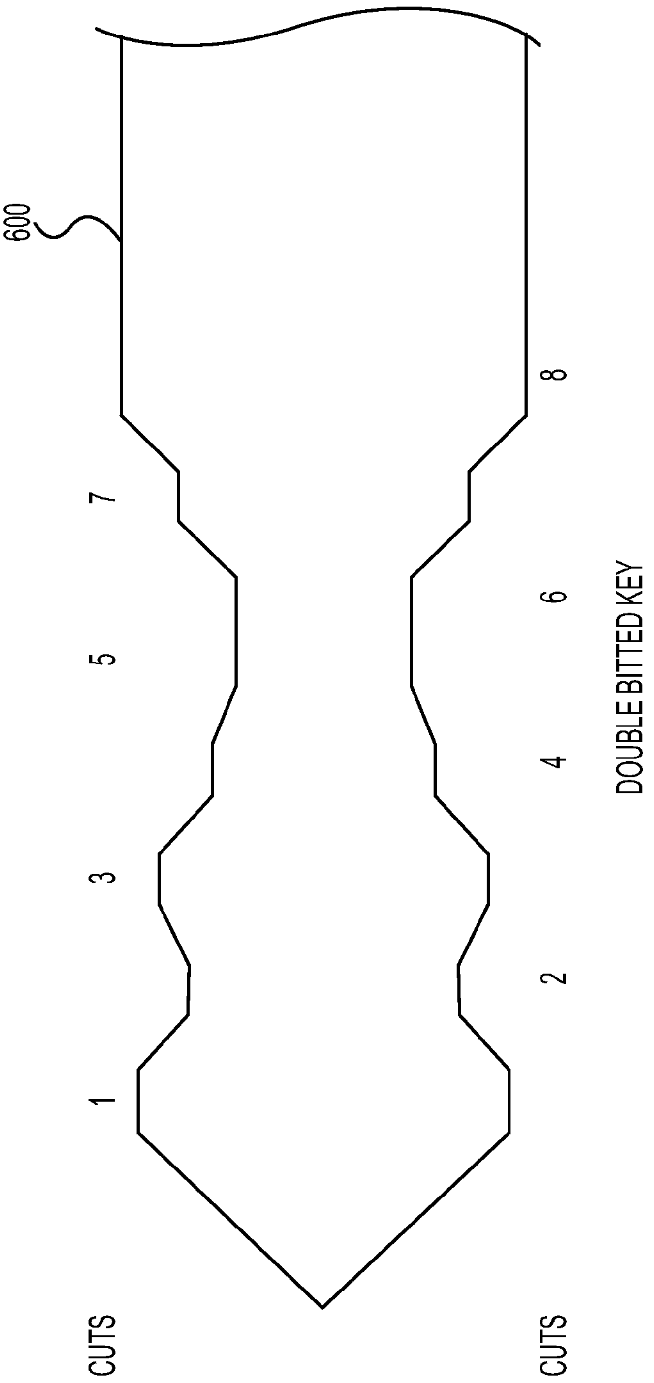
FIG. 5 is a representation of key cuts for a double bitted wafer tumble lock.

Wafer tumbler locks can be single-bitted or double-bitted. Single-bitted locks use a key that has cuts along one side, whereas double-bitted locks require cuts on both sides of the key 600, as shown in FIG. 5. Reading wafers along one side of a double bitted lock results in every other cut along the key. If there is an 8-cut key, there will be 4 cuts along each side. One side will have cuts 1, 3, 5, 7 and the other cuts 2, 4, 6, 8 as shown in FIG. 5.

In fabricating the double bitted key 600 of FIG. 5, the EKI is removed from the lock, turned over, and the operations 500-516 repeated until a reliable code is created.

Before a key can be cut by code, the proper bitting orientation must be determined. A sub routine in "CODE TO DETERMINE ORIENTATION OF CUTS ON KEY:" below allows the proper placement of the cuts. The subroutine works by comparing the distance from the shutter door to the first wafer after both sides of the lock have been read. If the distance to the shutter is greater along the topside than on the bottom, then the top cuts are odd and the bottom cuts are even. In the event there is no shutter door present on the lock, the routine compares the distance between the last wafer that are read on each side of the key decoder.

An additional function provided by the EKI is the ability to determine the spacing between cuts. That function uses a subroutine that determines the distance between cuts by subtracting C2 of the current cut by C2 of the previous cut. The result is the distance between the wafers. For a single-bitted lock, this value will correspond directly to the specified spacing of the lock. For a double-bitted lock, the result will be twice the value of the specified spacing.

In some cases, single-bitted locks will require that the Reader be split into two conductors. This is because the spacing between these wafers is too small for a single conductor to pass between without coming into contact with both wafers at the same time.

The EKI may require calibration, as well as certain information about the lock being decoded. The process of calibration is normally performed by the developers of the product and not required by the user. In the event the user is required to calibrate the lock, the EKI must be used to record data from the lock of a known bitting. The lock must contain the full range of cuts in order for a complete calibration to be made. Once the information from the lock has been recorded, a correction factor for each of the cuts in the lock must be created and stored in a corresponding variable within the EKI database. An operator ensures that the EKI is reading the wafers properly. It should also record a significant number of scans before beginning correction factor assignments. A scan is the value recorded by the EKI when coming into contact a number one wafer.

Assuming the lock is calibrated for 5 depths, the calibrator must make sure that scan 1 corresponds to the No. 1 wafer. Scan 2 corresponds to the No. 2 wafer, and so on. Once the scans of all the different depths have been recorded, they are then assigned a correction factor, CF1-5. This correction factor is simply the difference between a scan value and the actual depth of the wafer. It may be necessary to repeat this process in the event the initial scanning of the lock is not statistically accurate.

Code to Determine Location of Shutter Door and Store Range:

```
Step 1
If Shutter Button Clicked Then
ShutterLoc = Position of Reader * 0.00241
ShutterRng = ShutterLoc + 0.375
Else
ShutterRng = 0
End If
Step 2.
```

Code to Determine if Reader has Passed the Shutter Door

```
If ShutterRng < Position of Reader * 0.00241) Then
Count = Val (TextBox10.Text) + 1
TextBox10.Text = Count
DecodeMe ( )
End If
```

If the reader has passed the shutter door then the above code allows the count variable to be incremented for the first time. The primary decoding sub-routine "decodeme" is then executed, using the tangent calculation to determine the depth of the cut.

Code to Determine Orientation of Cuts on Key:

```
ShutDist1 = Distance from the shutter door to the first
wafer on the top
ShutDist2 = Distance from the shutter door to the first
wafer on the bottom
Orientation = Cut type along the top
If ShutDist1 > ShutDist2 Then
Orientation = "Odd"
Else
Orientation = "Even"
End If
```

While the EKI has been disclosed in a preferred embodiment, various changes can be made in the EKI by a worker skilled in the art without departing from the scope of the claimed subject matter.

What is claimed is:

1. A device comprising:

a housing including a connector for connection to electronic circuitry, the housing securing a key decoder with a portion extended therefrom;

the key decoder containing a single longitudinal groove along at least a portion of the key decoder and divergent sloping surfaces at the end of the extended portion:

a conductor positioned in the single longitudinal groove that is insulated except for an exposed portion at the end of the conductor which serves as a reader;

an electrical measuring device secured to the housing and connected to the conductor for providing electrical signals to the electronic circuitry from the reader when the key decoder is in contact with and out of contact with a wafer tumbler in a lock, where the electrical signals correspond to the distance the reader has traveled within the lock from the entrance of the lock as the key decoder is urged in through the lock and a processor included in the electronic circuitry responsive to the electrical signals for mathematically determining cuts to be made in a key based on the electrical signals, the cuts representative of the positions of the wafer tumblers along a keyway of the lock for fabrication of a replacement key.

2. The device of claim 1 wherein the conductor includes a tip for engaging wafer tumblers and serving as a reader of wafer tumbler positions along the keyway.

3. The device of claim 1 wherein the electrical measuring device provides a first electrical signal C1 indicative of the position of the reader upon first contact with the wafer tumbler.

4. The device of claim 3 wherein the measuring provides a second signal C2 indicative of the position of the reader when no longer in contact with the wafer tumbler.

5. The device of claim 1 wherein the processor stores within a memory a constant L2 representative of the horizontal length of the sloping surface measured from a juncture of the sloping surfaces.

6. The device of claim 1 wherein the processor stores within a memory a constant L3 representative of the vertical length of a sloping surface measured from a juncture of the sloping surfaces.

7. The device of claim 1 wherein the processor calculates the angle (θ) from the vertical length divided by horizontal length of the sloping surface using Tangent tables.

8. The device of claim 1 wherein the processor performs a mathematical computation to calculate a dimension Y from the tangent tables for the angle (θ) using the Tangent for (θ) times a length X equal to the difference of L2 less L1 the distance of the reader positions contacting the wafer tumbler and no longer in touch with the wafer tumbler.

9. The device of claim 8 wherein the processor calculates a cut for the wafer tumbler by subtracting Y from L3 representative of the vertical length of a sloping surface measured from a juncture of the sloping surfaces.

10. The device of claim 9 wherein the processor provides a cut for each wafer tumbler.

11. The device of claim 1 wherein the measuring device includes a slider for urging the reader through the keyway, the reader engaging the wafer tumblers of the lock and generating electrical signals indicative of the distance of the wafer tumblers along the keyway from the entrance thereof as a basis for impressioning cuts in the key decoder.

12. The device of claim 1 wherein the processor stores within a memory a constant L1 representative of the horizontal length of the sloping surface measured from a junction on the sloping interface where the reader comes in contact with a wafer to a juncture on the sloping interface where the reader's contact with the wafer ends.

13. A method, comprising:

securing a key decoder to housing with a portion extending there from, the key decoder insertable in a keyway and having a longitudinal groove along a surface thereof;

installing a connector in the longitudinal groove that is insulated except for an exposed portion at the end which serves as a reader for connection to an electronic measuring device including a slider;

urging the key decoder through the keyway via the slider, the key decoder successively engaging wafers of a lock as it is inserted in through the lock, the measuring device providing signals when the key decoder is in contact with and out of contact with the wafers, where the electrical signals correspond to the distance the reader has traveled within the lock from the entrance of the lock as the slider urges the connector in through the keyway; and transmitting electrical signals from the measuring device to the electronic circuitry, the signals indicative of the position of the reader in the keyway, the computer system using the signals for mathematically identifying a cut for each wafer in forming an impression of the wafer tumblers in the lock as a basis for fabricating a replacement key.

14. The method of claim 13 wherein the electrical measuring device provides a first electrical signal C1 indicative of the position of the reader upon first contact with the wafer tumbler.

15. The method of claim 14 wherein the measuring device provides a second signal C2 indicative of the position of the reader when no longer in contact with the wafer tumbler.

16. The method of claim 13 wherein the computer system stores with in a memory a constant L2 representative of the horizontal length of the sloping surface measured from a juncture of the sloping surfaces.

17. The method of claim 13 wherein the computer system stores within a memory a constant L3 representative of the vertical length of a sloping surface measured from a juncture of the sloping surfaces.

18. The method of claim 13 wherein the processor calculates the angle (θ) from the vertical length divided by horizontal length of the sloping surface using Tangent tables.

19. The method of claim 13 wherein the computer system performs a mathematical computation to calculate a dimension Y from the tangent tables for the angle (θ) using the Tangent for (0) times a length X equal to the difference of L2 less L1 the distance of the reader positions contacting the wafer tumbler and no longer in touch with the wafer tumbler.

20. The method of claim 19 wherein the computer system calculates a cut for the wafer tumbler by subtracting Y from L3 representative of the vertical length of a sloping surface measured from a juncture of the sloping surfaces.

21. The method of claim 13 wherein the computer system provides a cut for each wafer tumbler.

22. The system of claim 13 wherein the processor stores within a memory a constant L1 representative of the horizontal length of the sloping surface measured from a junction on the sloping interface where the reader comes in contact with a wafer to a juncture on the sloping interface where the reader's contact with the wafer ends.

* * * * *